United States Patent
Kodaypak

(10) Patent No.: US 10,171,945 B2
(45) Date of Patent: *Jan. 1, 2019

(54) LOCATION BASED PROVISIONING AND BROADCASTING OF CONTENT UTILIZING A MULTIMEDIA BROADCAST SERVICE

(71) Applicant: AT&T INTELLECTUAL PROPERTY I, L.P., Atlanta, GA (US)

(72) Inventor: Rajendra Prasad Kodaypak, Sammamish, WA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/893,559

(22) Filed: Feb. 9, 2018

(65) Prior Publication Data

US 2018/0167778 A1  Jun. 14, 2018

Related U.S. Application Data

(63) Continuation of application No. 14/816,851, filed on Aug. 3, 2015, now Pat. No. 9,900,744.

(51) Int. Cl.
*H04M 11/04* (2006.01)
*H04W 4/02* (2018.01)
(Continued)

(52) U.S. Cl.
CPC .......... *H04W 4/023* (2013.01); *H04L 12/189* (2013.01); *H04L 12/1845* (2013.01); *H04W 4/90* (2018.02);
(Continued)

(58) Field of Classification Search
CPC ....... H04W 4/023; H04W 24/10; H04W 4/22; H04W 76/007; H04W 72/005; H04W 68/005; H04L 12/1845; H04L 12/189
(Continued)

(56) References Cited

U.S. PATENT DOCUMENTS 7,917,150 B2   3/2011   Kim et al.
8,311,557 B2   11/2012  Annamalai
(Continued)

OTHER PUBLICATIONS

Office Action for U.S. Appl. No. 14/816,851 dated Sep. 7, 2016, 8 pages.
(Continued)

*Primary Examiner* — Charles Shedrick
(74) *Attorney, Agent, or Firm* — Amin, Turocy & Watson, LLP

(57) ABSTRACT

Location based provisioning and broadcasting of content utilizing a multimedia broadcast service is presented herein. A system can comprise a service component, a location component, and a content component. The service component can be configured to receive a request for a client service. The location component can be configured to determine, based on the request, a location corresponding to a mobile device. Based on the location, the content component can be configured to provision a broadcast service device to source content corresponding to the client service, and initiate a broadcast transmission of the content to the mobile device, e.g., using a broadcast enabled access point device that is configured to send broadcast data to multiple devices via a point-to-multipoint communication protocol.

20 Claims, 10 Drawing Sheets

(51) Int. Cl.
*H04W 24/10* (2009.01)
*H04W 72/00* (2009.01)
*H04W 68/00* (2009.01)
*H04L 12/18* (2006.01)
*H04W 76/50* (2018.01)
*H04W 4/90* (2018.01)
*H04W 76/40* (2018.01)
*H04W 64/00* (2009.01)

(52) U.S. Cl.
CPC ......... *H04W 24/10* (2013.01); *H04W 68/005* (2013.01); *H04W 72/005* (2013.01); *H04W 76/40* (2018.02); *H04W 76/50* (2018.02); *H04W 64/00* (2013.01)

(58) Field of Classification Search
USPC ................. 455/402.1, 404.1; 725/62, 118
See application file for complete search history.

(56) References Cited

U.S. PATENT DOCUMENTS

| | | | |
|---|---|---|---|
| 8,472,974 B2 | 6/2013 | Annamalai et al. |
| 8,473,984 B1 | 6/2013 | Harmon et al. |
| 8,515,386 B2 | 8/2013 | Hasenfang et al. |
| 8,730,986 B2 | 5/2014 | Wang et al. |
| 8,780,876 B2 | 7/2014 | Etemad et al. |
| 8,798,099 B2 | 8/2014 | Larsson |
| 8,811,252 B2 | 8/2014 | Maeda et al. |
| 8,949,451 B2 | 2/2015 | Einarsson et al. |
| 9,030,988 B2 | 5/2015 | Sayeed et al. |
| 9,094,927 B2 | 7/2015 | Annamalai et al. |
| 2002/0123354 A1 | 9/2002 | Nowak |
| 2003/0148771 A1 | 8/2003 | de Verteuil |
| 2004/0236826 A1 | 11/2004 | Harville et al. |
| 2005/0005019 A1 | 1/2005 | Harville et al. |
| 2007/0067807 A1 | 3/2007 | O'Neil |
| 2011/0173249 A1 | 7/2011 | Lee et al. |
| 2012/0287837 A1 | 11/2012 | Kim et al. |
| 2013/0163444 A1 | 6/2013 | Tee et al. |
| 2013/0294321 A1 | 11/2013 | Wang et al. |
| 2015/0040162 A1 | 2/2015 | Kotecha et al. |
| 2015/0094060 A1 | 4/2015 | Kouridakis et al. |
| 2015/0288647 A1 | 10/2015 | Chhabra et al. |

OTHER PUBLICATIONS

Final Office Action for U.S. Appl. No. 14/816,851 dated Apr. 6, 2017, 10 pages.

LOCATION BASED PROVISIONING AND BROADCASTING OF CONTENT UTILIZING A MULTIMEDIA BROADCAST SERVICE

RELATED APPLICATION

The subject patent application is a continuation of, and claims priority to, U.S. patent application Ser. No. 14/816,851 (now U.S. Pat. No. 9,900,744), filed Aug. 3, 2015, and entitled "LOCATION BASED PROVISIONING AND BROADCASTING OF CONTENT UTILIZING A MULTIMEDIA BROADCAST SERVICE," the entirety of which application is hereby incorporated by reference herein.

TECHNICAL FIELD

The subject disclosure generally relates to embodiments for location based provisioning and broadcasting of content utilizing a multimedia broadcast service.

BACKGROUND

Conventional wireless technologies, such as Multimedia Broadcast Multicast Service Operation on Demand (MooD) technology, enable users to access a broadcast steam of information utilizing unicast service resources. However, such technologies have had some drawbacks with respect to overloading of the unicast service resources, leaving much room for improvement.

BRIEF DESCRIPTION OF THE DRAWINGS

Non-limiting embodiments of the subject disclosure are described with reference to the following figures, wherein like reference numerals refer to like parts throughout the various views unless otherwise specified.

DETAILED DESCRIPTION

Figure 1:
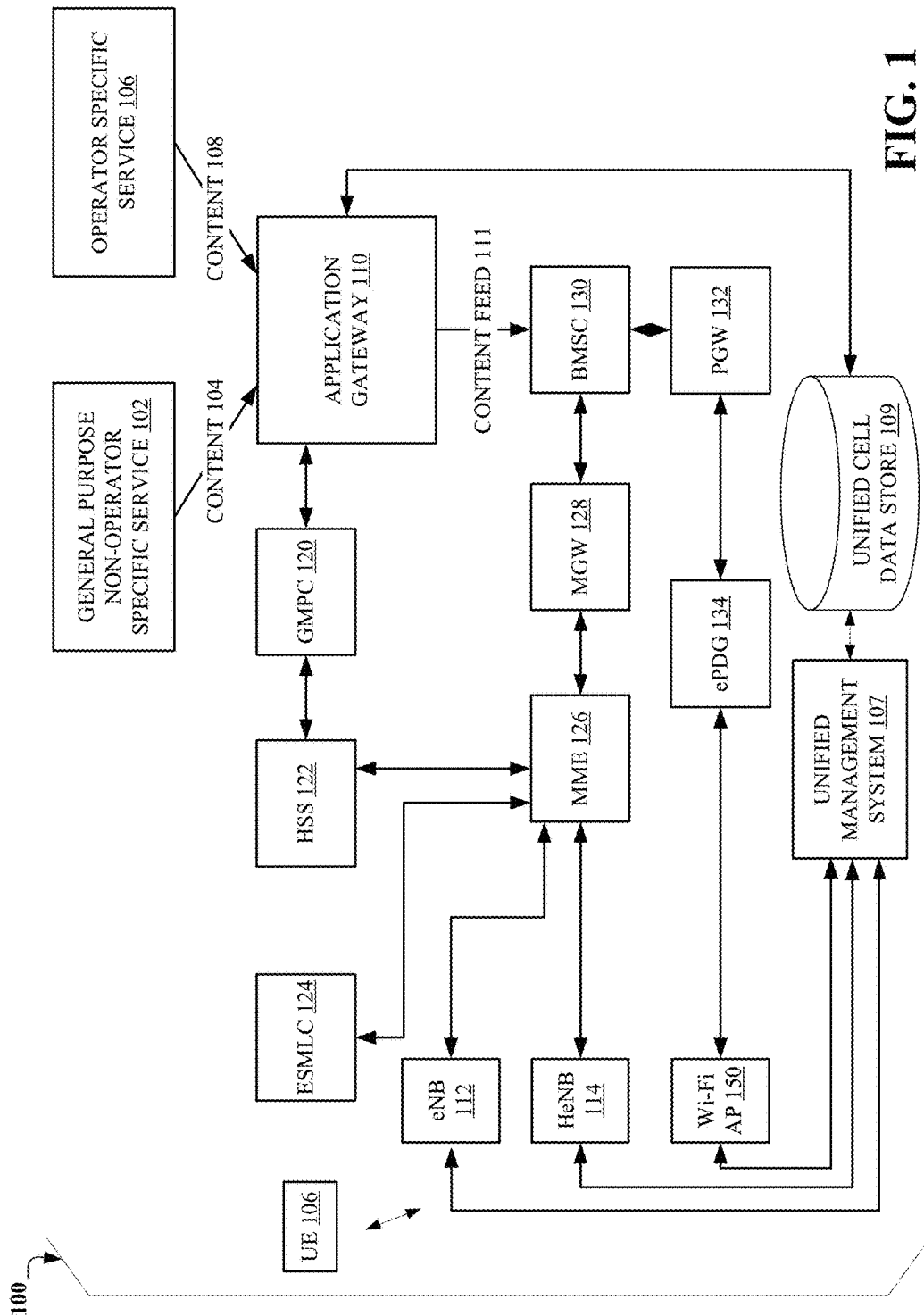
FIG. 1 illustrates a block diagram of a location based provisioning and broadcasting network environment, in accordance with various embodiments.

Aspects of the subject disclosure will now be described more fully hereinafter with reference to the accompanying drawings in which example embodiments are shown. In the following description, for purposes of explanation, numerous specific details are set forth in order to provide a thorough understanding of the various embodiments. However, the subject disclosure may be embodied in many different forms and should not be construed as limited to the example embodiments set forth herein.

Conventional wireless technologies do not proactively monitor use of unicast resources, and consequently have had some drawbacks with respect to overloading of such resources. Various embodiments disclosed herein can conserve unicast resources by provisioning and broadcasting content to a mobile device, e.g., based on a determined location of the mobile device.

For example, a system can comprise a processor, and a memory that stores executable instructions that, when executed by the processor, facilitate performance of operations, comprising: based on receiving a request for a client service, determining a location corresponding to a mobile device; and based on the location, provisioning a broadcast service device to source content corresponding to the client service, and initiating a broadcast transmission of the content to the mobile device, e.g., using a broadcast enabled access point device that is configured to send broadcast data to multiple devices via a point-to-multipoint communication protocol, e.g., via a long term evolution (LTE) evolved Multimedia Broadcast Multicast Service (eMBMS).

In an embodiment, the client service can comprise a general purpose, non-operator specific service, e.g., a public safety based service, an emergency based service, a value added service, a commercial service, etc. In another embodiment, the client service can comprise an operator specific service.

In one embodiment, the determining of the location can comprise a "coarse positioning" evaluation in which an access point location of an access point (AP), Evolved Node B (eNB), femto AP, home eNB (HeNB), Wi-Fi AP, etc. can be determined, e.g., utilizing a data store, unified management system, etc. comprising position, location, etc. information of access point devices of respective networks. In this regard, the broadcast transmission, e.g., of the public safety, emergency, etc. based service can be directed to multiple devices within a wireless coverage area of the AP, eNB, femto AP, HeNB, Wi-Fi AP, etc.

In another embodiment, the determining of the location can comprise a "fine positioning" evaluation in which a device location of the mobile device can be determined via a control plane of a communication network, e.g., utilizing various location based technologies, e.g., cellular, Global Positioning System (GPS), Observed Time Difference of Arrival (OTDA), Cell Identification (CID), Enhanced Cell Identification (ECID), etc. In this regard, the broadcast transmission, e.g., of the value added, commercial, emergency, operator specific, etc. service can be directed to a particular mobile device, user equipment (UE), wireless device, etc.

In yet another embodiment, the determining of the device location can comprise distributing location requests, e.g., fine positioning based requests, across network devices of respective communication networks, core networks, etc. to obtain the device location. In this regard, the distributing of the location requests can comprise forwarding the location requests to the network devices in a sequential, round-robin, etc. manner until the device location is obtained.

In an embodiment, a method can comprise: receiving, by a system comprising a processor, a client service request; determining, by the system, a location corresponding to a UE; and in response to selecting, sourcing, supplying, etc. content corresponding to the client service request based on the location, broadcasting, by the system based on the location, the content to the UE via a broadcast enabled access point device, e.g., LTE-Broadcast enabled AP, that is configured to send broadcast data to multiple devices via a point-to-multipoint communication protocol, e.g., LTE eMBMS based protocol.

In one embodiment, the determining the location can comprise determining, via a control plane of a communication network, a device location of the UE, e.g., utilizing various location based technologies, e.g., cellular, GPS, OTDA, CID, ECID, etc.

In another embodiment, the determining the device location can comprise sequentially distributing location requests to network devices of respective communication networks, e.g., in a round-robin, sequential, etc. manner, to obtain the device location. In yet another embodiment, the determining the device location can comprise determining an access point location of the broadcast enabled access point device.

Yet another embodiment can comprise a computer-readable storage device having stored thereon executable instructions that, in response to execution, cause a device comprising a processor to perform operations, the operations comprising: in response to receiving a request for a communication service, determining a location corresponding to a wireless device; and in response to the determining the location, provisioning a network device to provide content corresponding to the communication service, and initiating a broadcast transmission of the content to the wireless device via a broadcast enabled access point device that is configured to send broad broadcast data to multiple devices via a point-to-multipoint communication protocol, e.g., an LTE eMBMS based protocol.

In an embodiment, the determining the location can comprise estimating a device location of the wireless device utilizing a control plane of a communication network, e.g., utilizing various location based technologies, e.g., cellular, GPS, OTDA, CID, ECID, etc.

In another embodiment, the estimating the device location can comprise sending location requests to a set of network devices of respective communication networks in a sequential, round-robin, etc. manner to obtain the device location. In yet another embodiment, the determining the location can comprise determining an access point location of the broadcast enabled access point device.

Reference throughout this specification to "one embodiment," or "an embodiment," means that a particular feature, structure, or characteristic described in connection with the embodiment is included in at least one embodiment. Thus, the appearances of the phrase "in one embodiment," or "in an embodiment," in various places throughout this specification are not necessarily all referring to the same embodiment. Furthermore, the particular features, structures, or characteristics may be combined in any suitable manner in one or more embodiments.

Furthermore, to the extent that the terms "includes," "has," "contains," and other similar words are used in either the detailed description or the appended claims, such terms are intended to be inclusive—in a manner similar to the term "comprising" as an open transition word—without precluding any additional or other elements. Moreover, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

As utilized herein, terms "component," "function", "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, components can execute from various computer readable media having various data structures stored thereon. The components can communicate via local and/or remote processes such as in accordance with a signal having one or more data packets (e.g., data from one component interacting with another component in a local system, distributed system, and/or across a network, e.g., the Internet, with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. In yet another example, a component can be an apparatus that provides specific functionality through electronic components without mechanical parts; the electronic components can comprise one or more processors therein to execute software and/or firmware that confer(s), at least in part, the functionality of the electronic components.

Aspects of systems, apparatus, and processes explained herein can constitute machine-executable instructions embodied within a machine, e.g., embodied in a computer readable medium (or media) associated with the machine. Such instructions, when executed by the machine, can cause the machine to perform the operations described. Additionally, the systems, processes, process blocks, etc. can be embodied within hardware, such as an application specific integrated circuit (ASIC) or the like. Moreover, the order in which some or all of the process blocks appear in each process should not be deemed limiting. Rather, it should be understood by a person of ordinary skill in the art having the benefit of the instant disclosure that some of the process blocks can be executed in a variety of orders not illustrated.

Furthermore, the word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art having the benefit of the instant disclosure.

The disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can comprise, but are not limited to, magnetic storage devices, e.g., hard disk; floppy disk; magnetic strip(s); optical disk (e.g., compact disk (CD), digital video disc (DVD), Blu-ray Disc (BD)); smart card(s); and flash memory device(s) (e.g., card, stick, key drive); and/or a virtual device that emulates a storage device and/or any of the above computer-readable media.

In accordance with various embodiments, processor(s) for implementing embodiments disclosed herein can comprise distributed processing devices, or parallel processing devices, in a single machine, device, etc., or across multiple machines, devices, etc. Furthermore, the processor(s) can comprise a state machine, an application specific integrated circuit (ASIC), or a programmable gate array (PGA), e.g., field PGA (FPGA). In this regard, when the processor(s) execute instruction(s) to perform "operations", the processor(s) can perform the operations directly, and/or facilitate, direct, or cooperate with other device(s) and/or component(s) to perform the operations.

In accordance with various aspects of the subject specification, artificial intelligence based systems, components, etc. can employ classifier(s) that are explicitly trained, e.g., via a generic training data, as well as implicitly trained, e.g., via observing characteristics of communication equipment, e.g., a network device, a gateway, a wireless communication device, etc., by receiving reports from such communication equipment, by receiving operator preferences, by receiving historical information, by receiving extrinsic information, etc. For example, support vector machines can be configured via a learning or training phase within a classifier constructor and feature selection module. Thus, the classifier(s) can be used by an artificial intelligence system to automatically learn and perform a number of functions, e.g., performed by application gateway 110 (see below), comprising, but not limited to, in response to receiving a request for a client service, determining a location corresponding to a mobile device; and based on the location, provisioning a broadcast service device to source content corresponding to the client service, and initiating a broadcast transmission of the content to the mobile device, e.g., using a broadcast enabled access point device that is configured to send broadcast data to multiple devices via a point-to-multipoint communication protocol.

A classifier can be a function that maps an input attribute vector, $x=(x1, x2, x3, x4, xn)$, to a confidence that the input belongs to a class, that is, $f(x)=confidence(class)$. Such classification can employ a probabilistic and/or statistical-based analysis (e.g., factoring into the analysis utilities and costs) to infer an action that a user desires to be automatically performed. In the case of communication systems, for example, attributes can be information received from access points, servers, components of a wireless communication network, etc., and the classes can be categories or areas of interest (e.g., levels of priorities). A support vector machine is an example of a classifier that can be employed. The support vector machine operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein can also be inclusive of statistical regression that is utilized to develop models of priority.

For example, the classifier(s) can be used by the artificial intelligence system, e.g., application gateway 110 (see below), to automatically distribute location requests, e.g., fine positioning based requests corresponding to a particular UE, across network devices of respective communication networks, core networks, etc. in a sequential, round-robin, etc. manner.

As used herein, the term "infer" or "inference" refers generally to the process of reasoning about, or inferring states of, the system, environment, user, and/or intent from a set of observations as captured via events and/or data. Captured data and events can comprise user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

As utilized herein, the terms "logic," "logical," "logically," and the like are intended to refer to any information having the form of instruction signals and/or data that may be applied to direct the operation of a processor. Logic may be formed from signals stored in a device memory. Software is one example of such logic. Logic may also be comprised by digital and/or analog hardware circuits, for example, hardware circuits comprising logical AND, OR, XOR, NAND, NOR, and other logical operations. Logic may be formed from combinations of software and hardware. On a network, logic may be programmed on a server, or a complex of servers. A particular logic unit is not limited to a single logical location on the network.

Aspects, features, and/or advantages of the disclosed subject matter can be exploited in substantially any wired telecommunication technology and/or any wireless telecommunication or radio technology, e.g., Institute of Electrical and Electronics Engineers (IEEE) 802.XX technology, e.g., Wi-Fi, Bluetooth, etc; worldwide interoperability for microwave access (WiMAX); enhanced general packet radio service (GPRS); third generation partnership project (3GPP) LTE; third generation partnership project 2 (3GPP2); ultra mobile broadband (UMB); 3GPP UMTS; high speed packet access (HSPA); high speed downlink packet access (HSDPA); high speed uplink packet access (HSUPA); LTE advanced (LTE-A), global system for mobile communication (GSM), near field communication (NFC), Wibree, Wi-Fi Direct, etc.

Further, selections of a radio technology, or radio access technology, can comprise second generation (2G), third generation (3G), fourth generation (4G), etc. evolution of the radio access technology; however, such selections are not intended as a limitation of the disclosed subject matter and related aspects thereof. Further, aspects, features, and/or advantages of the disclosed subject matter can be exploited in disparate electromagnetic frequency bands. Moreover, terms like "user equipment," "mobile station," "mobile device," "mobile subscriber station," "access terminal,"

"terminal", "handset," "appliance," "machine," "wireless communication device," "cellular phone," "personal digital assistant," "smartphone," "wireless device", and similar terminology refer to a wired and/or wireless device, or wired and/or wireless communication device, which is at least one of (1) utilized by a subscriber of a wired and/or wireless service, communication service, etc. to receive and/or convey data associated with voice, video, sound, and/or substantially any data-stream or signaling-stream; or (2) utilized by a subscriber of a voice over IP (VoIP) service that delivers voice communications over IP networks such as the Internet or other packet-switched networks. Further, the foregoing terms are utilized interchangeably in the subject specification and related drawings.

Likewise, the terms "local wireless communications cite," "access point" (AP), "base station," "Node B," "eNodeB" (eNB), and the like are utilized interchangeably in the subject specification and drawings and refer to a wireless network component or apparatus that sends and/or receives data associated with voice, video, sound, and/or substantially any data-stream or signaling-stream between a set of subscriber stations and/or to/from a wireless communication device—unless context warrants particular distinction(s) among the terms. Further, the data and signaling streams can be packetized or frame-based flows.

A communication network, e.g., corresponding to location based provisioning and broadcasting network environment 100, control plane based location determination network environment 300, etc. for systems, methods, and/or apparatus disclosed herein can comprise any communication network, e.g., mobile and/or wire line-based circuit-switched communication network, etc. comprising, e.g., a global systems for mobile communication (GSM) network, a time division multiple access (TDMA) network, a code division multiple access (CDMA) network, such as IS-95 and subsequent iterations of CDMA technology, an integrated digital enhanced network (iDEN) network, a public switched telephone network (PSTN), etc. Further, examples of the communication network can comprise any suitable data packet-switched or combination data packet/circuit-switched communication network, wired or wireless IP network such as a VoLTE network, a VoIP network, an IP data network, a UMTS network, a general packet radio service (GPRS) network, or other communication networks that provide streaming data communication over IP and/or integrated voice and data communication over combination data packet/circuit-switched technologies.

Similarly, one of ordinary skill in the art will appreciate that a communication device, mobile device, UE, etc. (see e.g., UE 106, UE 306) for systems, methods, and/or apparatus disclosed herein can comprise a wireless device, a wired device, e.g., physically coupled to the communication network, a mobile device, a mobile phone, a 2G, 3G, 4G, . . . , etc. cellular communication device, a PSTN phone, a cellular communication device, a cellular phone, a satellite communication device, a satellite phone, a VoIP phone, Wi-Fi phone, a dual-mode cellular/Wi-Fi phone, a combination cellular/VoIP/Wi-Fi/WiMAX phone, a smartphone, a laptop device, a tablet device, a television device, a vehicle device, a home security system device, a portable computer, a wireless system, a sensor, or any suitable combination thereof. Specific examples of the communication device can comprise, but are not limited to, a cellular device, such as a GSM, TDMA, CDMA, IS-95 and/or iDEN phone, a cellular/Wi-Fi device, such as a dual-mode GSM, TDMA, IS-95 and/or iDEN/VoIP phones, UMTS phones, UMTS VoIP phones, a Wibree based device, or like devices or combinations thereof.

Figure 2:
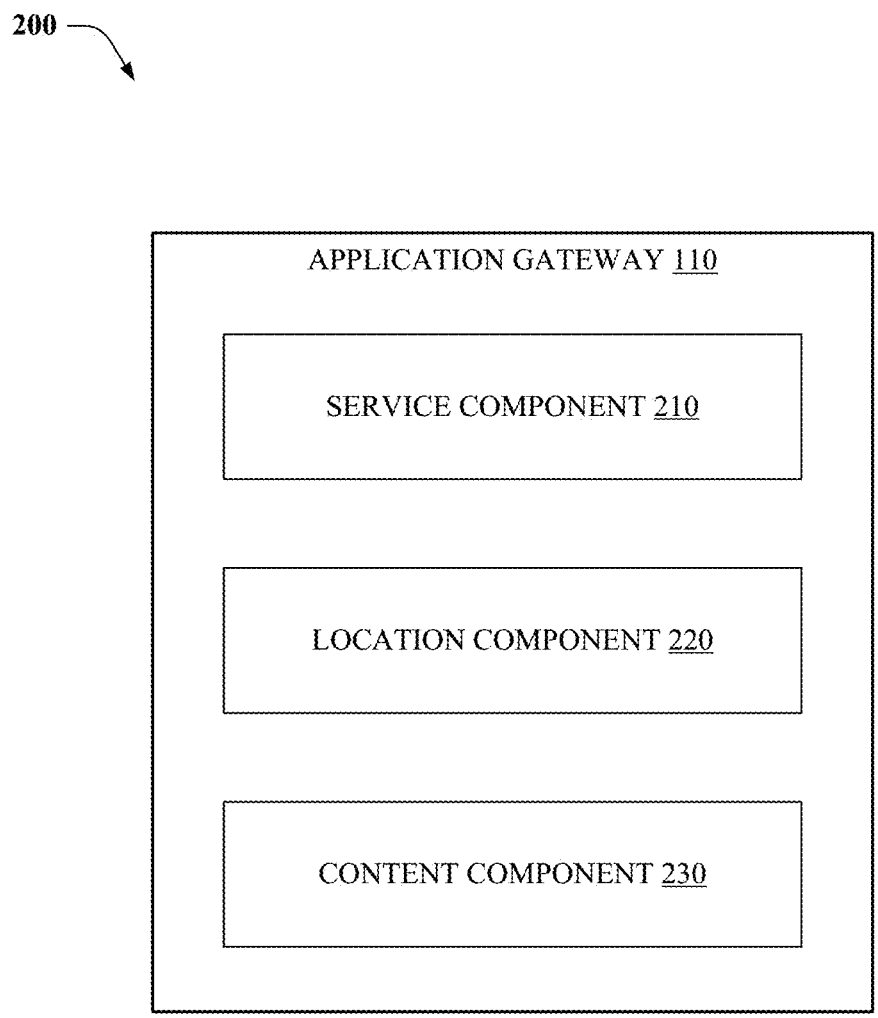
FIG. 2 illustrates a block diagram of an application gateway, in accordance with various embodiments.

As mentioned, conventional wireless technologies have had some drawbacks with respect to taxing unicast resources. On the other hand, various embodiments disclosed herein can conserve unicast resources by provisioning and broadcasting content to a mobile device, e.g., based on a determined location of the mobile device. In this regard, and now referring to FIGS. 1-3, application gateway 110, e.g., a proxy service device, can comprise service component 210, location component 220, and content component 230. Service component 210 can receive a request for a client service, e.g., general purpose non-operator specific service 102, operator specific service 106, etc. from respective location services clients, service providers, etc. (not shown).

In embodiment(s), general purpose non-operator specific service 102 can comprise a public safety based service, an emergency based service, a commercial service, a value added service, etc. For example, the public safety and/or emergency based service can trigger an emergency notification comprising content with respect to a location of a detected accident, traffic condition, road condition, weather event, etc. In embodiment(s), the content (e.g., content 104) can comprise public safety information, e.g., a picture, map, etc. of the location that can be directed to multiple mobile devices (e.g., UE 106, UE 306) warning users that are near the accident, traffic condition, etc.

In an embodiment, location component 220 can perform, based on the emergency notification, a "coarse positioning" evaluation to determine an access point location of an AP (e.g., eNB 112, HeNB 114, Wi-Fi AP 150) corresponding to the location of the detected accident, traffic condition, road condition, weather event, etc. For example, location component 220 can send an AP location query to unified management system 107, e.g., an element management system (EMS), to obtain, from unified cell data store 109, information, e.g., latitude and longitude information, representing the access point location. In this regard, unified management system 107 can store information representing locations of respective access points, e.g., eNB 112, HeNB 114, Wi-Fi AP 150, etc. in unified call data store 109.

Further, based on the access point location, content component 230 can provision a broadcast service device, e.g., broadcast multicast service center (BMSC) 130, to source, select, provide, etc. the content (e.g., content feed 111) with respect to the location of the detected accident, traffic condition, road condition, weather event, etc., and initiate a broadcast transmission of the content to UE 106 using a broadcast enabled access point device, e.g., eNB 112, that is configured to send broadcast data to multiple devices via a point-to-multipoint communication protocol, e.g., via an LTE eMBMS provider. In this regard, BMSC 130 can source content feed 111 as a live video stream, generic file, moving picture experts group (MPEG) dynamic adaptive streaming over hypertext transfer protocol (MPEG-DASH) video stream, etc. to be broadcast as the broadcast data.

Coupled to BMSC 130, Multimedia Broadcast Multicast Service (MBMS) gateway (MGW) 128 can deliver the broadcast data, e.g., MBMS-based traffic, to multiple cell sites in a single transaction using Internet protocol (IP) multicast. MGW 128 is coupled to mobility management entity (MME) 126, which can perform MBMS session control signaling, e.g., MBMS session start, update, and stop. Further, MME 126 can deliver quality of service (QoS) information and MBMS service area information to a multicell/multicast coordination entity (MCE) (not shown), which can administer radio resources for an MBMS session to all radios, eNBs, etc. that are part of the MBMS service area.

In an embodiment, BMSC 130 is coupled to public data network gateway (PGW) 132 to facilitate the unicast transmission of the broadcast data from a Wi-Fi AP to the mobile device. PGW 132 can perform policy enforcement, packet filtering, charging support, lawful interception, packet screening, and act as an anchor for mobility between 3GPP and non-3GPP technologies, e.g., Wi-Fi, WiMAX, etc.

PGW 132 is coupled to evolved packet data gateway (ePDG) 134, which can act as a termination node of IP security (IPsec) tunnels established with the mobile device. In this regard, ePDG 134 can secure data transmission, e.g., IP communications, to the mobile device over untrusted, non-3GPP access via the Wi-Fi AP.

In one embodiment, the commercial and/or value added service can trigger a commercial based notification comprising content with respect to a determined location of a mobile device, e.g., UE 106. For example, the content (e.g., content 104) can comprise an advertisement, promotion, etc. directed and/or targeted to the mobile device based on the determined location. In another embodiment, operator specific service 106 can comprise an operator, service provider, application provider, etc. based service that can trigger a service notification comprising content with respect to the determined location of the mobile device. In this regard, the content (e.g., content 108) can comprise information corresponding to a specialized service, e.g., home security service, etc.

In yet another embodiment, location component 220 can perform, based on the commercial based notification and/or the service notification, a "fine positioning" evaluation to determine a device location of the mobile device via a control plane of provisioning and broadcasting network environment 100, e.g., utilizing various location based technologies, e.g., cellular, GPS, OTDA, CID, ECID, etc.

For example, location component 220 can send a location request to gateway mobile positioning center (GMPC) 120. GMPC 120 can query, based on the location request, home subscriber server (HSS) 122 to determine a serving MME (e.g. MME 126) corresponding to the mobile device (e.g. UE 106). In turn, GMPC 120 can send the location request to the serving MME, which subsequently can forward the location request to enhanced serving mobile location center (ESMLC) 124. ESMLC 124 can determine, based on the location request, the device location, e.g., utilizing a network based positioning feature to obtain eNB measurements representing the device location, utilizing a UE assisted/based positioning procedure to obtain UE measurements representing the device location, etc.

In turn, ESMLC 124 can return location estimate information representing the device location to the serving MME. Further, the serving MME can return the location estimate information to GMPC 120, which can forward the location estimate information to location component 220.

In this regard, based on the device location, content component 230 can provision the broadcast service device, e.g., BMSC 130, to source, select, provide, etc. the content (e.g., content feed 111), and initiate a broadcast transmission of the content to the mobile device using a broadcast enabled access point device (e.g., eNB 112) as a live video stream, etc. In this regard, the broadcast transmission can be directed, based on the device location, to a particular mobile device, UE, wireless device, etc. with respect to, e.g., the value added service, the commercial service, the operator specific service, etc. For example, the operator specific service can comprise a home security based service, which can send targeted content, e.g., a video feed, alarm information, etc. to the mobile device while a subscriber of such service is away from his/her residence, home, etc.

Figure 3:
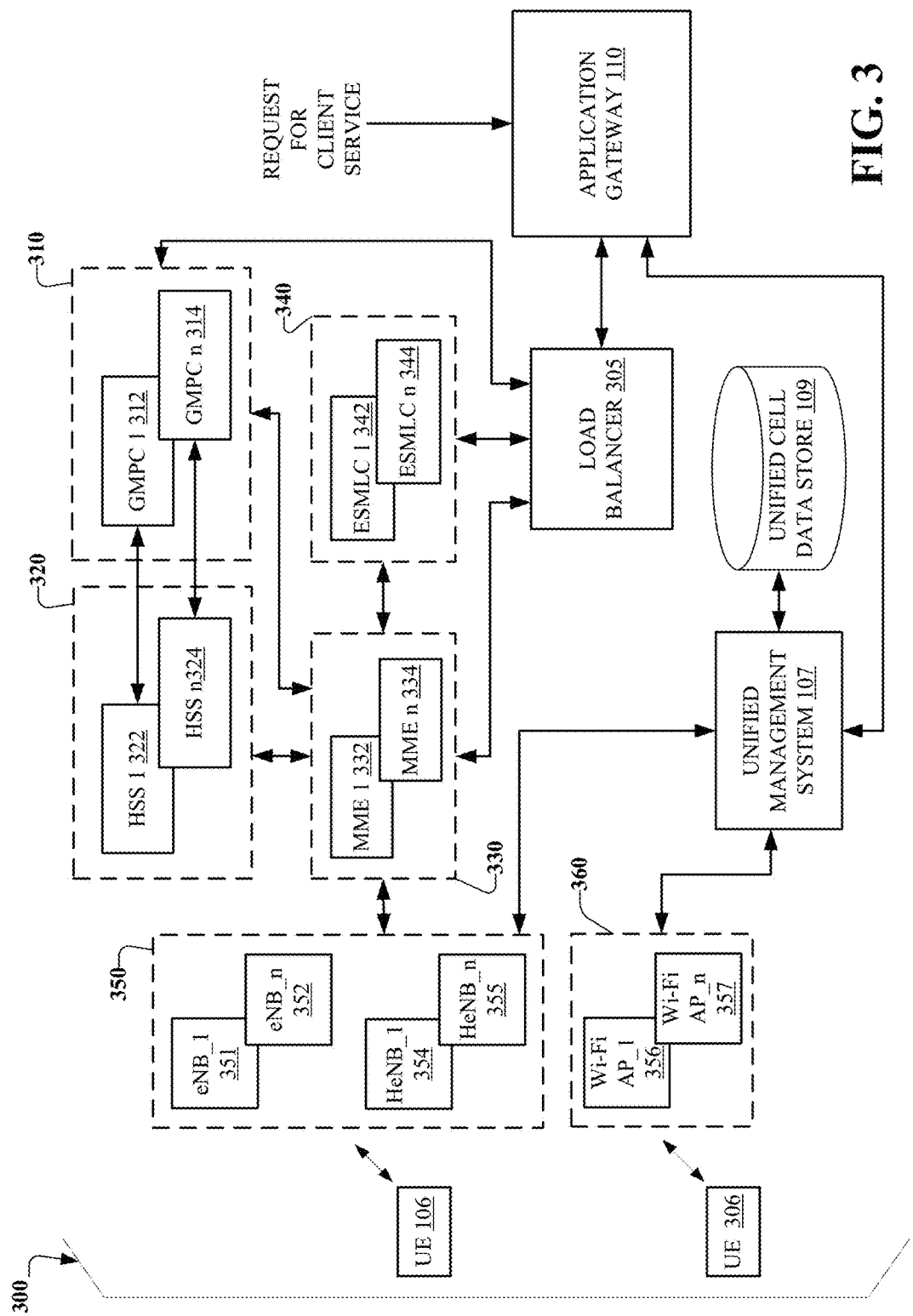
FIG. 3 illustrates a block diagram of a control plane based location determination network environment, in accordance with various embodiments.

Referring now to an embodiment illustrated by FIG. 3, control plane based location determination network environment 300 comprises load balancer 305, which can receive a device location request from application gateway 110, and distribute location requests, e.g., fine positioning based requests, across devices (310 to 360) of respective communication networks, core networks, etc. (not shown) to obtain the device location. For example, load balancer 305 can sequentially forward the location requests to GMPC_1 312 to GMPC_n 314 of devices 310 of the respective networks. In another example, load balancer 305 can distribute the location requests to GMPC_1 312 to GMPC_n 314 of devices 310 in a round-robin manner to ensure uniform, or nearly uniform, distribution of the location requests across GMPCs.

In this regard, in response to receiving a location request, a GMPC of devices 310 can query an associated HHS of devices 320, e.g., HSS_1 322 to HSS_n 324, to determine a serving MME, e.g., MME_1 332 to MME_n 334 of devices 330, corresponding to the mobile device, e.g., UE 106, UE 306, etc. Once the serving MME has been determined, the corresponding GMPC can send the location request to the serving MME, which subsequently can forward the location request to an associated ESMLC, e.g., EMSLC_1 342 to EMSLC_n 344 of devices 340.

In turn, the associated ESMLC can determine, based on the location request, the device location, e.g., utilizing a network based positioning feature to obtain eNB measurements, e.g., from a serving AP (e.g., eNB_1 351 to eNB_n 352 of devices 350) corresponding to the mobile device, e.g., utilizing a UE assisted/based positioning procedure to obtain UE measurements representing the device location, etc. Further, the associated ESMLC can return location estimate information representing the device location to the serving MME. Further, the serving MME can return the location estimate information to the corresponding GMPC, which can forward the location estimate information to load balancer 305. In turn, load balancer 305 can return the location estimate information to application gateway 110.

In other embodiments, load balancer 305 can obtain the device location based on querying, via unified management system 107, position information corresponding to a serving AP, e.g., eNB_1 351 to eNB_n 352 and HeNB_1 354 to HeNB_n 355 of devices 350, Wi-Fi AP_1 356 to Wi-Fi AP_n 357 of devices 360, etc.

FIGS. 4-9 illustrate methodologies in accordance with the disclosed subject matter. For simplicity of explanation, the methodologies are depicted and described as a series of acts. It is to be understood and appreciated that various embodiments disclosed herein are not limited by the acts illustrated and/or by the order of acts. For example, acts can occur in various orders and/or concurrently, and with other acts not presented or described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Figure 4:
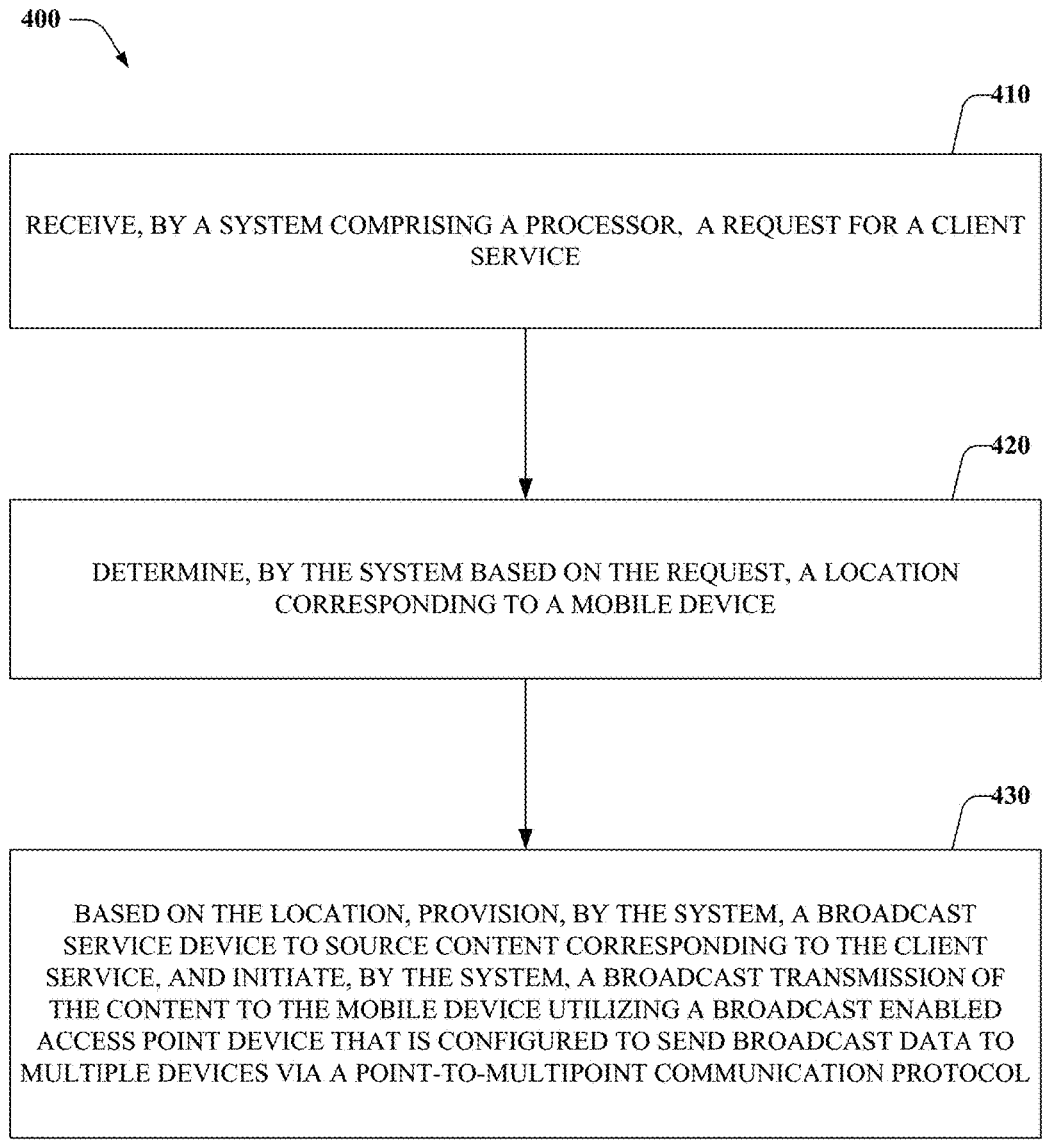
FIG. 4 illustrates a flowchart of a method performed by an application gateway, in accordance with various embodiments.

Referring now to FIG. 4, process 400 performed by a system comprising a processor, e.g., application gateway 110, is illustrated, in accordance with various embodiments. At 410, a request for a client service can be received. In an embodiment, the client service can comprise a general purpose, non-operator specific service, e.g., a public safety based service, an emergency based service, a value added service, a commercial service, etc. In another embodiment, the client service can comprise an operator specific service, e.g., home security based service.

At 420, a location corresponding to a mobile device can be determined. In one embodiment, the location can represent an access point location of an AP, e.g., with respect to the public safety based service, the emergency based service, etc. In another embodiment, the location can represent a device location corresponding to a mobile device, e.g., with respect to the value added service, the commercial service, the operator specific service, etc.

At 430, based on the location, a broadcast service device, e.g., BMSC 130, can be provisioned to source content corresponding to the client service, and a broadcast transmission of the content to the mobile device can be initiated—utilizing a broadcast enabled AP device that is configured to send broadcast data to multiple devices via a point-to-multi-point communication protocol.

For example, in response to the location being determined to represent the access point location, the content can comprise public safety information that can be directed to multiple mobile devices via the AP. In another example, in response to the location being determined to represent the device location, the content can comprise an advertisement, promotion, information corresponding to an operator specified service, etc. that can be directed and/or targeted to the mobile device, a specific UE, etc. based on the device location.

Figure 5:
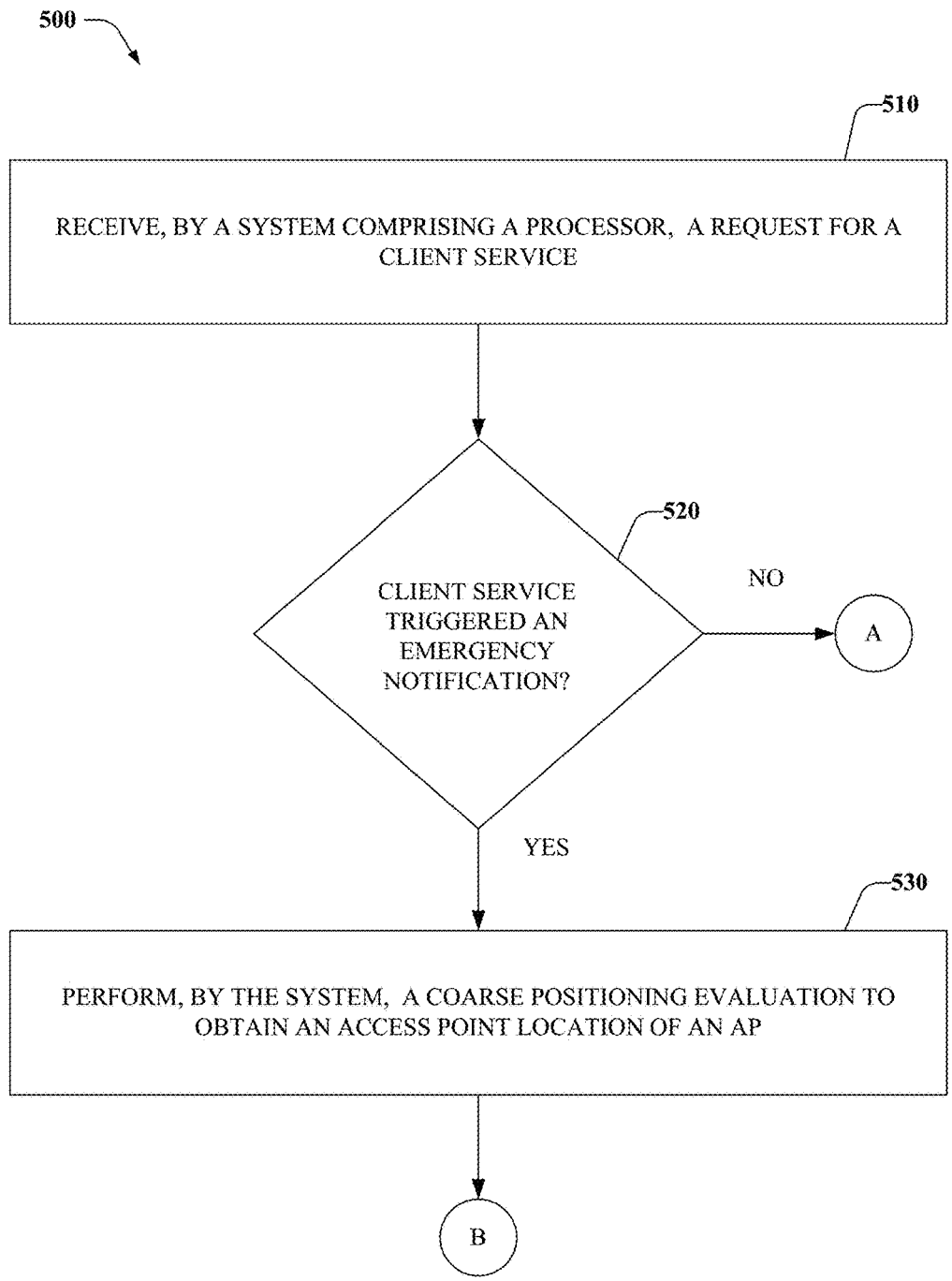
FIGS. 5-7 illustrate flowcharts of another method performed by the application gateway, in accordance with various embodiments.
Figure 6:
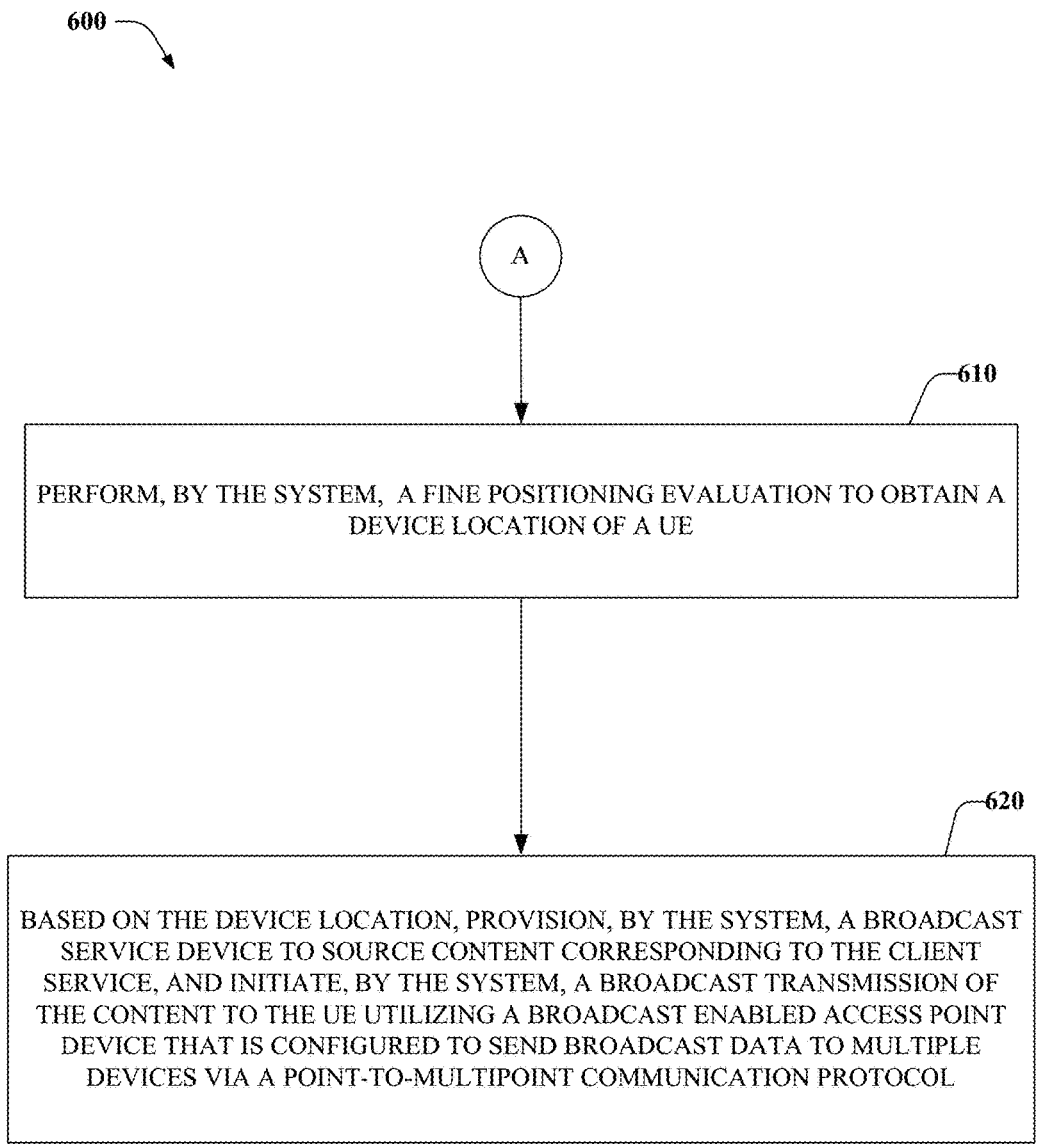
Figure 7:
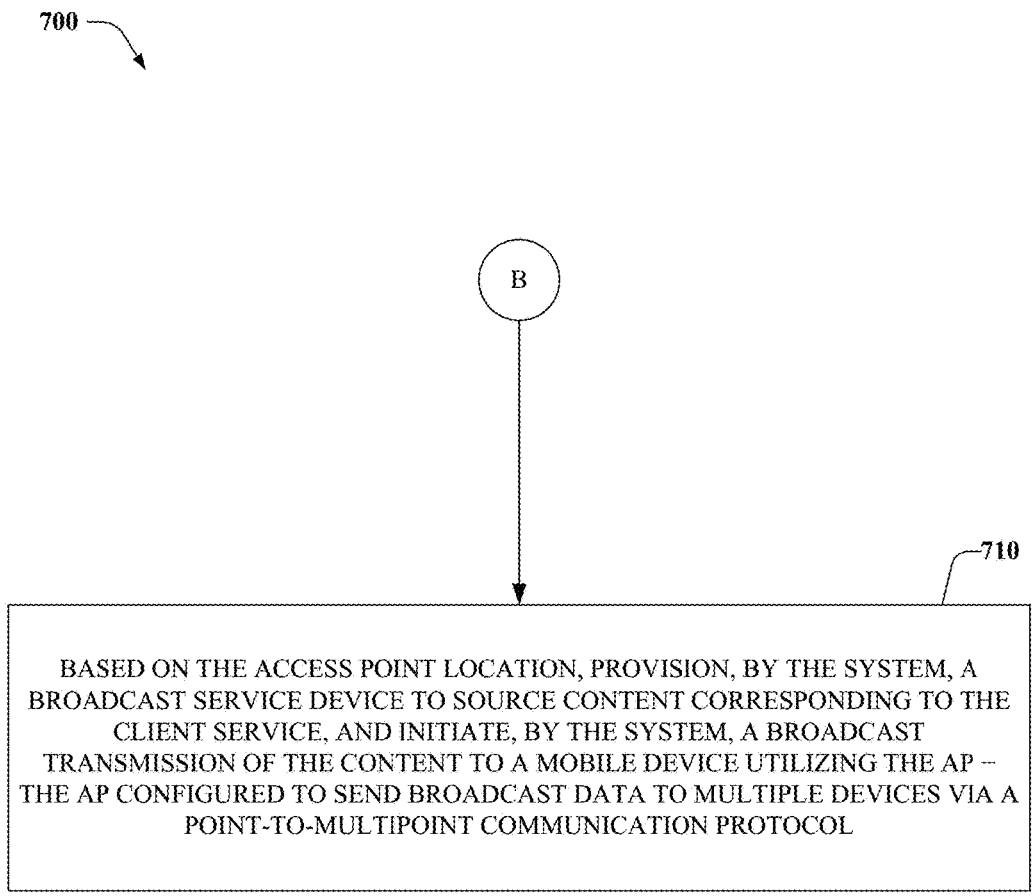

FIGS. 5-7 illustrate other processes (500-700) performed by the system, e.g., application gateway 110, in accordance with various embodiments. At 510, a request for a client service can be received. At 520, it can be determined whether the client service triggered an emergency notification. In this regard, if it is determined that the client service triggered the emergency notification, flow continues to 530, at which a coarse positioning evaluation can be performed to obtain an access point location of an AP; otherwise flow continues to 610, at which a fine positioning evaluation can be performed to obtain a device location of a UE. Flow continues from 610 to 620, at which a broadcast service device, e.g., BMSC 130, can be provisioned, based on the device location, to source content corresponding to the client service, and a broadcast transmission of the content to the UE can be initiated—utilizing a broadcast enabled AP device that is configured to send broadcast data to multiple devices via a point-to-multi-point communication protocol.

Returning to 530, flow continues from 530 to 710, at which a broadcast service device, e.g., BMSC 130, can be provisioned, based on the access point location, to source content corresponding to the client service, and a broadcast transmission of the content to a mobile device can be initiated—utilizing a broadcast enabled AP device that is configured to send broadcast data to multiple devices via a point-to-multi-point communication protocol.

Figure 8:
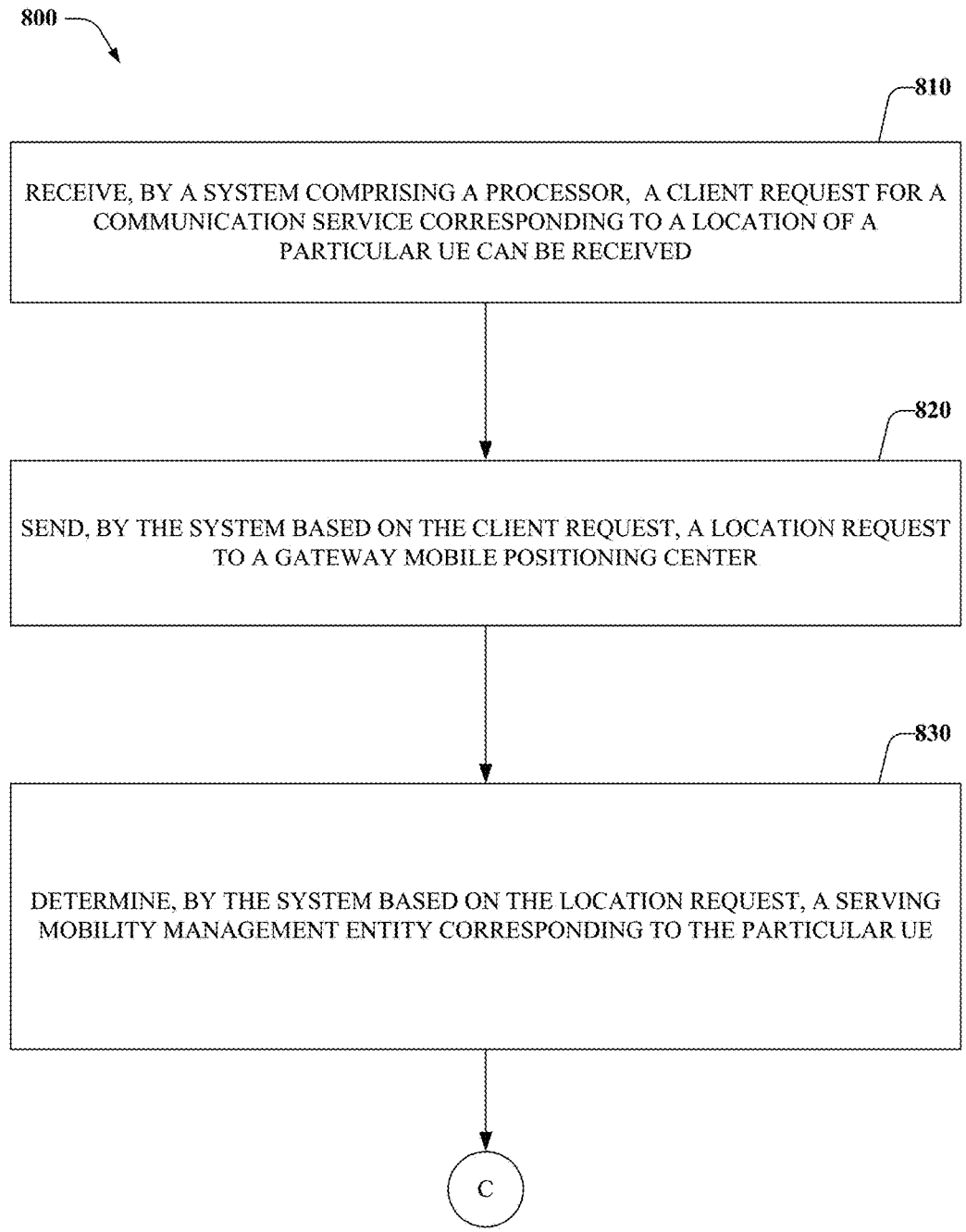
FIGS. 8-9 illustrate flowcharts of a method performed by a load balancer, in accordance with various embodiments.
Figure 9:
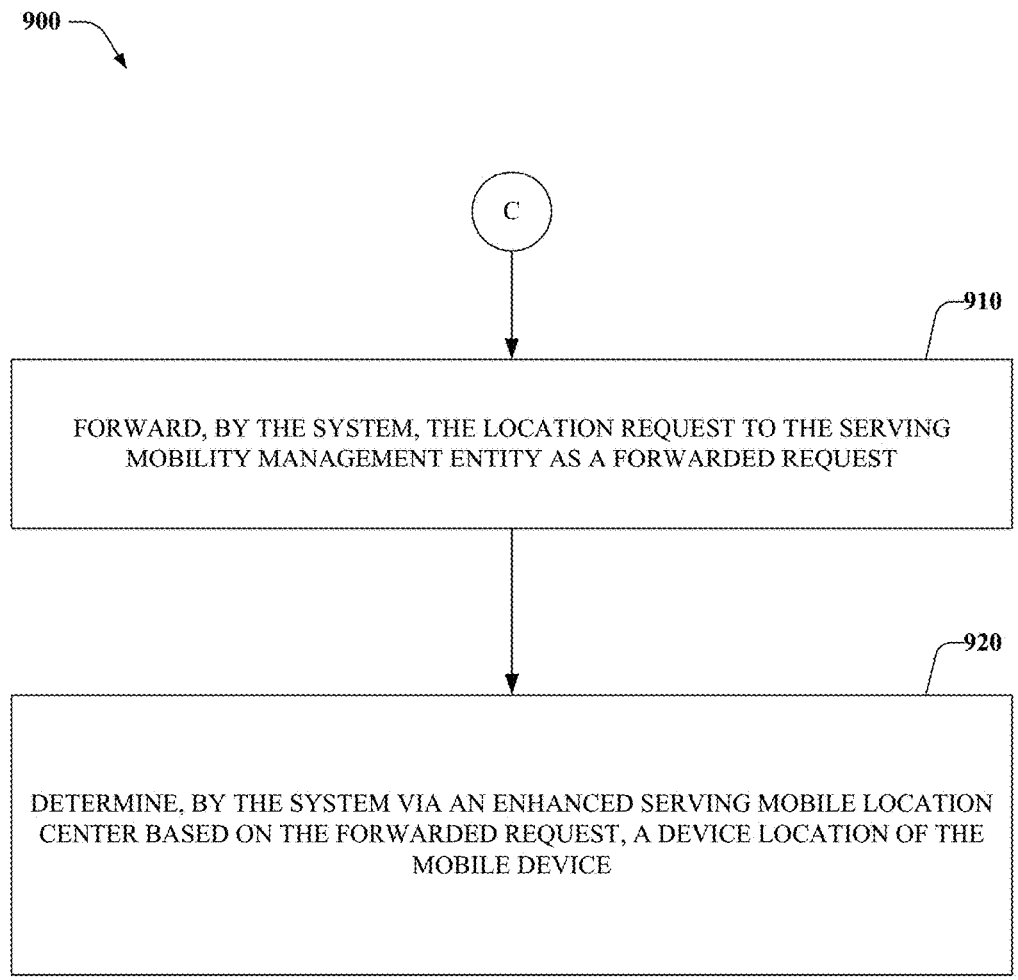

Now referring to FIGS. 8-9, processes (800-900) associated with load balancer 305 are illustrated, in accordance with various embodiments. At 810, a client request for a communication service corresponding to a location of a particular UE can be received. At 820, a location request can be sent to a GMPC, e.g., GMPC 120. At 830, a serving MME corresponding to the particular UE can be determined. At 910, the location request can be forwarded to the serving MME as a forwarded request. At 920, a device location of the particular UE can be determined via an ESMLC, e.g., ESMLC 124.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions and/or processes described herein. Processors can exploit nano-scale architectures such as, but not limited to, molecular and quantum-dot based transistors, switches and gates, in order to optimize space usage or enhance performance of mobile devices. A processor may also be implemented as a combination of computing processing units.

In the subject specification, terms such as "store," "data store," "data storage," "database," "storage medium", and substantially any other information storage component relevant to operation and functionality of a component and/or process, refer to "memory components," or entities embodied in a "memory," or components comprising the memory. It will be appreciated that the memory components described herein can be either volatile memory or nonvolatile memory, or can comprise both volatile and nonvolatile memory.

By way of illustration, and not limitation, nonvolatile memory, for example, can be included in unified cell data store 109, non-volatile memory 1022 (see below), disk storage 1024 (see below), and/or memory storage 1046 (see below). Further, nonvolatile memory can be included in read only memory (ROM), programmable ROM (PROM), electrically programmable ROM (EPROM), electrically erasable ROM (EEPROM), or flash memory. Volatile memory 1020 can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Figure 10:
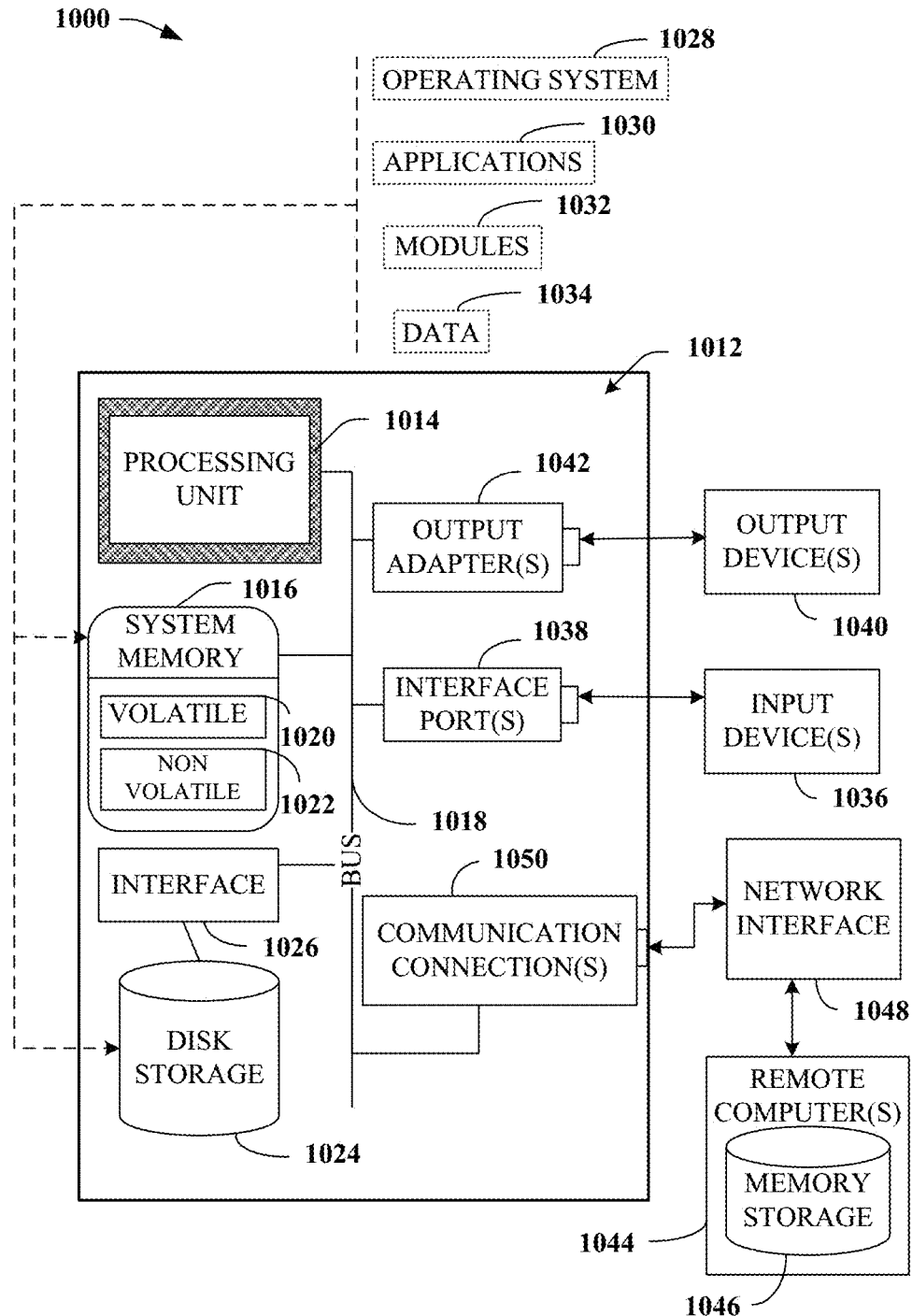
FIG. 10 is a block diagram representing an illustrative non-limiting computing system or operating environment in which one or more aspects of various embodiments described herein can be implemented.

In order to provide a context for the various aspects of the disclosed subject matter, FIG. 10, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that various embodiments disclosed herein can be implemented in combination with other program modules. Generally, program modules comprise routines, programs, components, data structures, etc. that perform particular tasks and/or implement particular abstract data types.

Moreover, those skilled in the art will appreciate that the inventive systems can be practiced with other computer system configurations, comprising single-processor or multiprocessor computer systems, computing devices, mini-computing devices, mainframe computers, as well as personal computers, hand-held computing devices (e.g., PDA, phone, watch), microprocessor-based or programmable consumer or industrial electronics, and the like. The illustrated aspects can also be practiced in distributed computing environments where tasks are performed by remote processing devices that are linked through a communication network; however, some if not all aspects of the subject disclosure can be practiced on stand-alone computers. In a distributed computing environment, program modules can be located in both local and remote memory storage devices.

With reference to FIG. 10, a block diagram of a computing system 1000 operable to execute the disclosed systems and methods is illustrated, in accordance with an embodiment. Computer 1012 comprises a processing unit 1014, a system memory 1016, and a system bus 1018. System bus 1018 couples system components comprising, but not limited to, system memory 1016 to processing unit 1014. Processing unit 1014 can be any of various available processors. Dual microprocessors and other multiprocessor architectures also can be employed as processing unit 1014.

System bus 1018 can be any of several types of bus structure(s) comprising a memory bus or a memory controller, a peripheral bus or an external bus, and/or a local bus using any variety of available bus architectures comprising, but not limited to, industrial standard architecture (ISA), micro-channel architecture (MSA), extended ISA (EISA), intelligent drive electronics (IDE), VESA local bus (VLB), peripheral component interconnect (PCI), card bus, universal serial bus (USB), advanced graphics port (AGP), personal computer memory card international association bus (PCMCIA), Firewire (IEEE 1394), small computer systems interface (SCSI), and/or controller area network (CAN) bus used in vehicles.

System memory 1016 comprises volatile memory 1020 and nonvolatile memory 1022. A basic input/output system (BIOS), containing routines to transfer information between elements within computer 1012, such as during start-up, can be stored in nonvolatile memory 1022. By way of illustration, and not limitation, nonvolatile memory 1022 can comprise ROM, PROM, EPROM, EEPROM, or flash memory. Volatile memory 1020 comprises RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1012 also comprises removable/non-removable, volatile/non-volatile computer storage media. FIG. 10 illustrates, for example, disk storage 1024. Disk storage 1024 comprises, but is not limited to, devices like a magnetic disk drive, floppy disk drive, tape drive, Jaz drive, Zip drive, LS-100 drive, flash memory card, or memory stick. In addition, disk storage 1024 can comprise storage media separately or in combination with other storage media comprising, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to system bus 1018, a removable or non-removable interface is typically used, such as interface 1026.

It is to be appreciated that FIG. 10 describes software that acts as an intermediary between users and computer resources described in suitable operating environment 1000. Such software comprises an operating system 1028. Operating system 1028, which can be stored on disk storage 1024, acts to control and allocate resources of computer system 1012. System applications 1030 take advantage of the management of resources by operating system 1028 through program modules 1032 and program data 1034 stored either in system memory 1016 or on disk storage 1024. It is to be appreciated that the disclosed subject matter can be implemented with various operating systems or combinations of operating systems.

A user can enter commands or information into computer 1012 through input device(s) 1036. Input devices 1036 comprise, but are not limited to, a pointing device such as a mouse, trackball, stylus, touch pad, keyboard, microphone, joystick, game pad, satellite dish, scanner, TV tuner card, digital camera, digital video camera, web camera, cellular phone, user equipment, smartphone, and the like. These and other input devices connect to processing unit 1014 through system bus 1018 via interface port(s) 1038. Interface port(s) 1038 comprise, for example, a serial port, a parallel port, a game port, a universal serial bus (USB), a wireless based port, e.g., Wi-Fi, Bluetooth, etc. Output device(s) 1040 use some of the same type of ports as input device(s) 1036.

Thus, for example, a USB port can be used to provide input to computer 1012 and to output information from computer 1012 to an output device 1040. Output adapter 1042 is provided to illustrate that there are some output devices 1040, like display devices, light projection devices, monitors, speakers, and printers, among other output devices 1040, which use special adapters. Output adapters 1042 comprise, by way of illustration and not limitation, video and sound devices, cards, etc. that provide means of connection between output device 1040 and system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. Remote computer(s) 1044 can be a personal computer, a server, a router, a network PC, a workstation, a microprocessor based appliance, a peer device, or other common network node and the like, and typically comprises many or all of the elements described relative to computer 1012.

For purposes of brevity, only a memory storage device 1046 is illustrated with remote computer(s) 1044. Remote computer(s) 1044 is logically connected to computer 1012 through a network interface 1048 and then physically and/or wirelessly connected via communication connection 1050. Network interface 1048 encompasses wire and/or wireless communication networks such as local-area networks (LAN) and wide-area networks (WAN). LAN technologies comprise fiber distributed data interface (FDDI), copper distributed data interface (CDDI), Ethernet, token ring and the like. WAN technologies comprise, but are not limited to, point-to-point links, circuit switching networks like integrated services digital networks (ISDN) and variations thereon, packet switching networks, and digital subscriber lines (DSL).

Communication connection(s) 1050 refer(s) to hardware/software employed to connect network interface 1048 to bus 1018. While communication connection 1050 is shown for illustrative clarity inside computer 1012, it can also be external to computer 1012. The hardware/software for connection to network interface 1048 can comprise, for example, internal and external technologies such as modems, comprising regular telephone grade modems, cable modems and DSL modems, wireless modems, ISDN adapters, and Ethernet cards.

The computer 1012 can operate in a networked environment using logical connections via wired and/or wireless communications to one or more remote computers, cellular based devices, user equipment, smartphones, or other computing devices, such as workstations, server computers, routers, personal computers, portable computers, microprocessor-based entertainment appliances, peer devices or other common network nodes, etc. The computer 1012 can connect to other devices/networks by way of antenna, port, network interface adaptor, wireless access point, modem, and/or the like.

The computer 1012 is operable to communicate with any wireless devices or entities operatively disposed in wireless communication, e.g., a printer, scanner, desktop and/or portable computer, portable data assistant, communications satellite, user equipment, cellular base device, smartphone, any piece of equipment or location associated with a wirelessly detectable tag (e.g., scanner, a kiosk, news stand, restroom), and telephone. This comprises at least Wi-Fi and Bluetooth wireless technologies. Thus, the communication can be a predefined structure as with a conventional network or simply an ad hoc communication between at least two devices.

Wi-Fi allows connection to the Internet from a desired location (e.g., a vehicle, couch at home, a bed in a hotel room, or a conference room at work, etc.) without wires. Wi-Fi is a wireless technology similar to that used in a cell phone that enables such devices, e.g., mobile phones, computers, etc., to send and receive data indoors and out, anywhere within the range of a base station. Wi-Fi networks use radio technologies called IEEE 802.11 (a, b, g, etc.) to provide secure, reliable, fast wireless connectivity. A Wi-Fi network can be used to connect communication devices (e.g., mobile phones, computers, etc.) to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
   receiving, by a system comprising a processor, a client service request;
   uniformly distributing, by the system, user equipment location requests among a group of gateway mobile positioning center devices to facilitate generation of location information representing locations of respective user equipments; and
   in response to the uniformly distributing the user equipment location requests among the group of gateway mobile positioning center devices, broadcasting, by the system based on a location of the locations corresponding to a user equipment of the respective user equipments, content corresponding to the client service request to the user equipment via a broadcast enabled access point device that is configured to send broadcast data to multiple devices via a point-to-multipoint communication protocol.

2. The method of claim 1, further comprising:
   in response to the uniformly distributing the user equipment location requests among the group of gateway mobile positioning center devices, determining, by the system, the location.

3. The method of claim 2, wherein the determining the location comprises:
   determining, via a control plane of a communication network, the location of the user equipment.

4. The method of claim 3, wherein the determining the location comprises:
   determining the location utilizing observed time difference of arrival based measurements.

5. The method of claim 3, wherein the determining the location comprises:
   determining the location utilizing global positioning system based measurements.

6. The method of claim 2, wherein the determining the location comprises:
   determining an access point location of the broadcast enabled access point device.

7. The method of claim 1, wherein the uniformly distributing the user equipment location requests comprises:
   distributing the user equipment location requests to the group of gateway mobile positioning center devices in a round-robin manner.

8. A system, comprising:
   a processor; and
   a memory that stores executable instructions that, when executed by the processor, facilitate performance of operations, comprising:
      based on receiving a request for a client service, uniformly distributing, via a control plane of a communication network, a defined amount of mobile device location requests across gateway mobile positioning center devices of respective communication networks to facilitate generation of information representing mobile device locations of respective mobile devices; and
      in response to the uniformly distributing the defined amount of the mobile device location requests across the gateway mobile positioning center devices, initiating a broadcast transmission of content corresponding to the client service to a mobile device of the respective mobile devices utilizing a broadcast enabled access point device that is configured to send broadcast data to multiple devices via a point-to-multipoint communication protocol.

9. The system of claim 8, wherein the operations further comprise:
determining, based on a global positioning system based measurement or a network based measurement, a mobile device location of the mobile device locations corresponding to the mobile device.

10. The system of claim 8, wherein the operations further comprise:
determining, based on an observed time difference of arrival of signals relative to the broadcast enabled access point device, a mobile device location of the mobile device locations corresponding to the mobile device.

11. The system of claim 8, wherein the client service corresponds to a commercial service.

12. The system of claim 8, wherein the client service corresponds to a service provider defined service.

13. The system of claim 8, wherein the operations further comprise:
determining, based on a device measurement received from the mobile device, a mobile device location of the mobile device locations corresponding to the mobile device.

14. The system of claim 8, wherein the uniformly distributing comprises:
forwarding the location requests to the network devices in a round-robin manner.

15. The system of claim 8, wherein the operations further comprise:
determining, based on an access point location of the broadcast enabled access point device, a mobile device location of the mobile device locations corresponding to the mobile device.

16. The system of claim 15, wherein the operations further comprise:
obtaining the access point location via a data store comprising positioning information for a group of access point devices comprising the broadcast enabled access point device.

17. The system of claim 15, wherein the client service comprises an emergency service or a public safety service.

18. A non-transitory machine-readable medium, comprising executable instructions that, when executed by a processor, facilitate performance of operations, comprising:
in response to receiving a request for a communication service, uniformly distributing location requests among gateway mobile positioning center devices of respective networks to facilitate a determination of locations of respective wireless devices, wherein a location of the locations represents a device location corresponding to a wireless device of the respective wireless devices; and
in response to the uniformly distributing the location requests among the gateway mobile positioning center devices, initiating a broadcast transmission of content corresponding to the communication service to the wireless device via a broadcast enabled access point device that is configured to send broad broadcast data to multiple devices via a point-to-multipoint communication protocol.

19. The non-transitory machine-readable medium of claim 18, wherein the operations further comprise:
estimating the device location utilizing a control plane of a communication network.

20. The non-transitory machine-readable medium of claim 19, wherein the estimating the device location comprises:
determining the device location based on an observed time difference of arrival of signals relative to the broadcast enabled access point device or global positioning system based measurements.

* * * * *